Patented Feb. 21, 1933

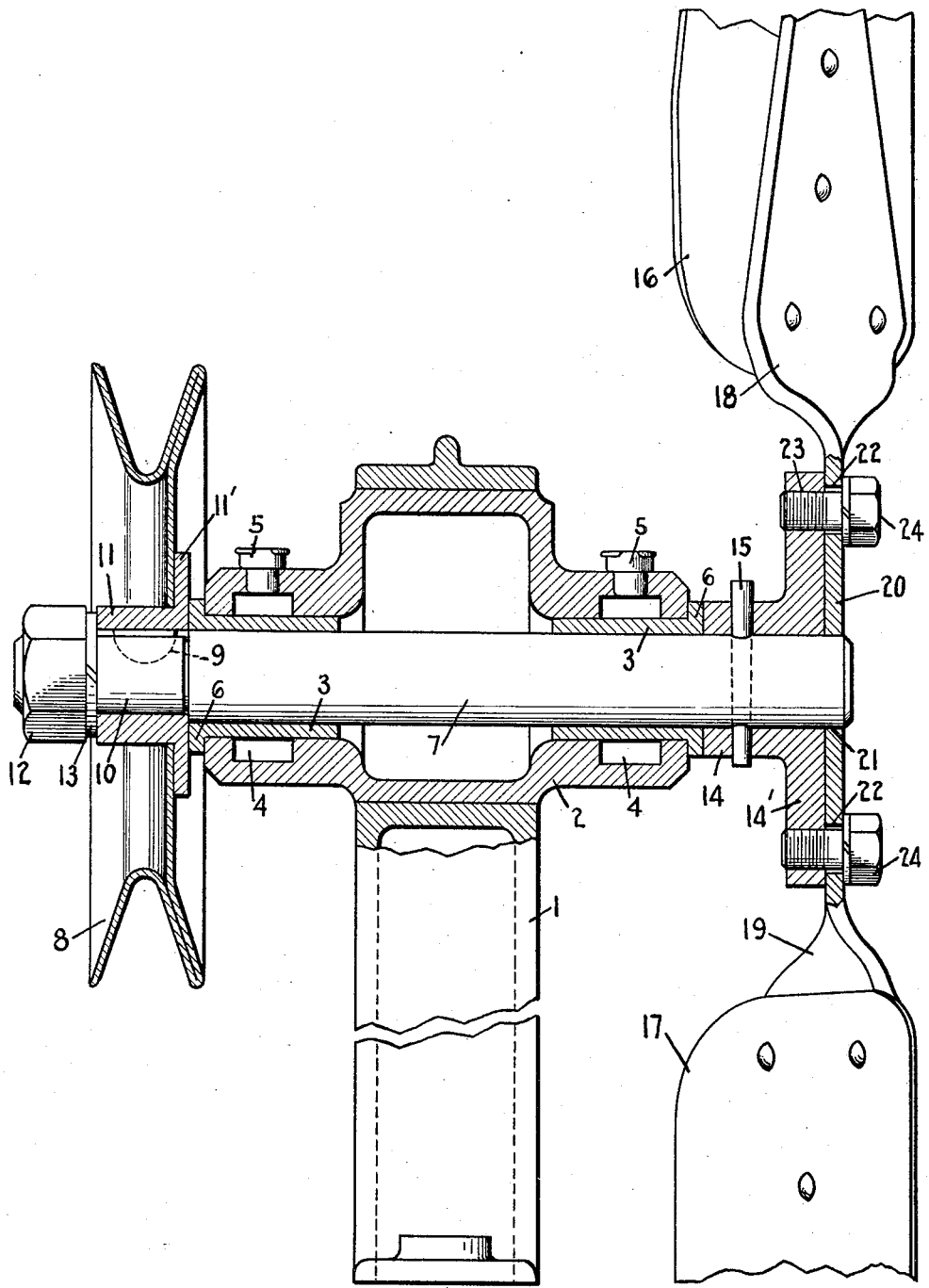

1,898,628

UNITED STATES PATENT OFFICE

CHARLES HOLLERITH, OF JACKSON, MICHIGAN, ASSIGNOR TO AUTOMOTIVE FAN & BEARING CO., A CORPORATION OF MICHIGAN

POSITIONING AND SECURING FAN BLADES

Application filed June 27, 1931. Serial No. 547,253.

This invention relates to automotive fans.

Cooling fans for automotive engines rotate at relatively high speeds and for this reason must be accurately balanced. It has heretofore been the practice to attach fan blades to spiders in balanced relation and then to secure the spider to the rotating part by means of a plurality of set screws spaced at a plurality of points at a given radius from the center of revolution.

No matter how carefully the holes are drilled and tapped for securing the spider to the rotating part it has been found impossible to produce an accurate balance in quantity production. The spider, except by mere accident in a few cases, will be located slightly off center. This unbalances the fan after assembly and the lack of balance excessively wears the bearings, produces an undesired strain on the fan blades and spider, makes the fan noisy and reduces its efficiency.

The manner in which I overcome these difficulties will now be described, reference being had to the drawing in which the single figure discloses a representative fan assembly.

The fan assembly is held in a bracket 1 secured to an appropriate part of the automotive engine, and in the case of automobiles, immediately behind the radiator. A bearing member 2 is secured in the bracket. This bearing member may be any type with plain bearings or so-called anti-friction bearings, either of the roller or ball type. I have shown a plain bearing consisting of two bushings 3 fitting in each end of the bearing casing. These bushings may be porous so as to admit oil from the oil chambers 4 into which lubricant may be introduced through the usual oil cups 5. The bushings 3 may have flanges or heads 6 fitting against the ends of the bearing housing 2. The rotatable shaft 7 fits within the bushings 3 and has a pulley 8 riveted, welded or otherwise fastened to a hub 11. This hub is fastened by any means such as a key 9 to the reduced end 10 of the shaft 7. The hub 11 preferably has a flange 11' adapted to bear against the inside flange 6 to form a thrust surface.
The pulley is further held in place on the axle by means of the nut 12 and lock washer 13.

On the other end of the shaft 7 is secured a fan hub 14 having a flange 14'. This fan hub may be secured to the shaft by means of a key or, as shown, by a pin 15, or by any other means. The end of the hub 14 abuts against the flange 6 of the outer bearing 3 so as to eliminate undue play while permitting free revolution of the parts. A plurality of fan blades 16, 17, are riveted, welded or otherwise secured to opposite projections 18, 19 of the spider 20. These blades are positioned on the projection so as to be in proper balance. The spider 20 has a central hole 21 which may fit over a mandrel or pin in an appropriate die while the fan blades are being secured to the projections on the spider. The dies and mandrel are designed so that the fan blades should normally be in correct balance but it is advisable to test the spider-blade assembly for balance before mounting in the bearing. In doing this the central hole 21 aligns the assembly over a test spindle with reference to which the assembly will be balanced if it is out of balance.

The spider 20 has a plurality of holes 22, uniformly spaced in a circle around the central bore 21. The flange 14' of the fan hub has a plurality of holes 23 similarly positioned around the bore in the hub member. It has been found impossible, as previously stated, to produce the desired accuracy of balance by merely clamping the spider to the flange of the hub by the screws 24 passing through the holes in the spider and threaded into the holes in the flange 14'. Therefore I make the holes 22 slightly larger in bore than the shank of the screw 24 so as to permit a limited amount of adjustment radially of the flange. The bore 21 is accurately machined to snugly fit the end of machined shaft 7.

After the blades have been assembled in the die, as already described, or otherwise, the fan blade and spider assembly is placed in position with the shaft 7 fitting into the hole 21, thus accurately balancing the blades and spider on the shaft. The screws 24 are then inserted in the holes 22 and screwed into the flange 14' with appropriate lock washers or other locking device. Any inaccuracy in the drilling of the holes 22 or 23 will still permit the blades to be accurately positoned on the shaft due to the normal clearance between the holes 22 and the shank of screw 24.

The foregoing improvement has resulted in accurately balanced fans with minimum amount of time and care in the assembling process.

Having described my invention, what I claim is:

1. In fans, a bearing member, a hub member having a central bore, a shaft rotatably mounted in said bearing member and extending through said bore, means to secure the shaft to the hub member, a fan spider having a bore snugly fitting over the protruding end of said shaft, fan blades fastened to said spider in balanced position around the bore therein, and means to secure said spider to said hub member.

2. In fans, a bearing member, a hub member having a central bore, a shaft rotatably mounted in said bearing member and extending through said bore, means to secure the shaft to the hub member, a fan spider having a central bore snugly fitting the protruding end of said shaft, fan blades fastened to said spider in balanced position around the bore therein, holes in said spider, and screws of lesser diameter than said holes passing therethrough to secure the spider to the hub member.

In testimony whereof, I have signed my name to this specification this 24th day of June, 1931.

CHARLES HOLLERITH.